United States Patent
Hedberg et al.

(10) Patent No.: US 10,015,713 B2
(45) Date of Patent: Jul. 3, 2018

(54) METHODS AND NETWORK NODES FOR ENHANCED MOBILITY BETWEEN MOBILE COMMUNICATIONS NETWORKS

(71) Applicant: Telefonaktiebolaget L M Ericsson (publ), Stockholm (SE)

(72) Inventors: Tomas Hedberg, Stockholm (SE); Filip Mestanov, Sollentuna (SE); Jari Vikberg, Järna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 146 days.

(21) Appl. No.: 14/898,927

(22) PCT Filed: Jun. 28, 2013

(86) PCT No.: PCT/SE2013/050830
§ 371 (c)(1),
(2) Date: Dec. 16, 2015

(87) PCT Pub. No.: WO2014/209194
PCT Pub. Date: Dec. 31, 2014

(65) Prior Publication Data
US 2016/0142955 A1    May 19, 2016

(51) Int. Cl.
H04W 36/14 (2009.01)
H04W 36/00 (2009.01)
H04W 12/06 (2009.01)

(52) U.S. Cl.
CPC ......... *H04W 36/14* (2013.01); *H04W 12/06* (2013.01); *H04W 36/0061* (2013.01); *H04W 36/0088* (2013.01)

(58) Field of Classification Search
None
See application file for complete search history.

(56) References Cited

U.S. PATENT DOCUMENTS

2007/0060127 A1*  3/2007  Forsberg .............. H04L 63/061
                                                      455/436
2007/0224988 A1    9/2007  Shaheen
(Continued)

FOREIGN PATENT DOCUMENTS

EP    1 601 221 A1    11/2005
EP    1601221 A1      11/2005
(Continued)

OTHER PUBLICATIONS

International Search Report and Written Opinion issued in corresponding International Application No. PCT/SE2013/050830, dated May 8, 2014, 19 pages.
(Continued)

*Primary Examiner* — Brandon M Renner
(74) *Attorney, Agent, or Firm* — Rothwell, Figg, Ernst & Manbeck, p.c.

(57) ABSTRACT

The disclosure relates to methods, a wireless device, a radio access node and computer programs for improving wireless device mobility between a first radio access network arranged to operate according to a first radio access technology and a second radio access network arranged to operate according to a second radio access technology. In particular, the disclosure relates to handover preparation procedure to improve handover of a wireless device (20) connected to a first radio access network (11) arranged to operate according to a first radio access technology to a second radio access network (12) arranged to operate according to a second radio access technology. The handover preparation procedure includes the sending of a handover prepare message (S47) from an access node (30) of a first radio access network to a connected wireless device (20). The wireless device prepares for handover by means of preparation signaling (S48) to access points of one or more second radio access networks indicated in the handover (Continued)

prepare message. The wireless device (20) informs the access node (30) upon concluding the handover preparation. Actual handover is ordered by means of a handover message (S52).

25 Claims, 6 Drawing Sheets

(56) References Cited

U.S. PATENT DOCUMENTS

| | | |
|---|---|---|
| 2008/0101318 A1 | 5/2008 | Taaghol et al. |
| 2012/0177003 A1* | 7/2012 | Chan ................ H04W 36/0066 370/331 |
| 2013/0279477 A1* | 10/2013 | Yang .................. H04W 76/046 370/331 |
| 2013/0308473 A1* | 11/2013 | Sun ....................... H04W 36/30 370/252 |
| 2013/0331105 A1* | 12/2013 | Olofsson ........... H04W 36/0005 455/438 |
| 2014/0105040 A1* | 4/2014 | Baker ................. H04W 52/367 370/252 |
| 2014/0328254 A1* | 11/2014 | Lim .................. H04W 36/0055 370/328 |
| 2015/0024757 A1* | 1/2015 | Bulakci ............ H04W 36/0016 455/437 |
| 2015/0141015 A1* | 5/2015 | Zhang ............... H04W 36/0061 455/436 |

FOREIGN PATENT DOCUMENTS

| | | |
|---|---|---|
| EP | 1 926 251 A1 | 5/2008 |
| EP | 1926251 A1 | 5/2008 |
| EP | 2 068 589 A1 | 6/2009 |
| WO | 2007/036764 A1 | 4/2007 |
| WO | 2008/066354 A1 | 6/2008 |
| WO | 2008/154218 A1 | 12/2008 |
| WO | 2010067959 A2 | 6/2010 |

OTHER PUBLICATIONS

International Preliminary Report on Patentability issued for the corresponding International Patent Application No. PCT/SE2013/050830 dated Dec. 29, 2015, 20 pages.

European Search Report issued in related Application No. 13887871.5, dated May 31, 2016, 4 pages.

Article 94(3) EPC communication issued in EP Application No. 13 887 871.5, dated Feb. 14, 2017, 6 pages.

* cited by examiner

METHODS AND NETWORK NODES FOR ENHANCED MOBILITY BETWEEN MOBILE COMMUNICATIONS NETWORKS

CROSS REFERENCE TO RELATED APPLICATION(S)

This application is a 35 U.S.C. § 371 National Phase Entry Application from PCT/SE2013/050830, filed Jun. 28, 2013, designating the United States, the disclosure of which is incorporated by reference.

TECHNICAL FIELD

The disclosure relates to methods, a wireless device, a radio access node and computer programs for improving wireless device mobility between a first radio access network arranged to operate according to a first radio access technology and a second radio access network arranged to operate according to a second radio access technology. In particular, the disclosure relates to methods and network nodes improving wireless device mobility between a long term evolution, LTE, radio access network and a wireless local area network, WLAN, access network.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a user equipment, UE, also known as a wireless device, is wirelessly connected to at least one radio access node, commonly referred to as a NodeB, NB, in UMTS, and as an evolved NodeB, eNodeB or eNode B, in LTE. A radio access node is a general term for a radio network node capable of scheduling transmission to and from wireless device and transmitting radio signals to a UE and receiving signals transmitted from a UE.

In 3GPP systems, a wireless device is allowed to attach to and access a wireless communication network if the wireless device is associated with a subscription that allows the wireless communication network to authenticate the wireless device.

Today wireless devices, such as mobile phones, typically support other wireless technologies such as Wireless Local Area Networks, commonly referred to as WLAN, in addition to the cellular standards. As a means to improve the network capacity in future networks, WLAN is intended to be an integral part. That is, WLAN will be regarded as just another radio access technology, so that handover can be made to WLAN or from WLAN without the user noticing that the service is no longer being carried by 3GPP technologies like WCDMA or LTE.

Mobile operators are today mainly using WLAN to offload traffic from the mobile networks but the opportunity to improve end user experience regarding performance is also becoming more important. The current WLAN deployments are basically totally separate from mobile networks, and are to be seen as non-integrated. The usage of WLAN is driven due to the free and wide unlicensed spectrum, and the increased availability of WLAN in mobile terminals like smart phones and tablets. The end users are also becoming more and more at ease with using WLAN for example at offices and homes.

Portable wireless devices today usually support both WLAN/Wi-Fi and a number of 3GPP cellular technologies, but many of the terminals are basically behaving as two separate devices, from a radio access perspective. The 3GPP radio access network and the modems and protocols that are operating pursuant to the 3GPP specifications are basically unaware of the wireless access Wi-Fi protocols and modems that are operating pursuant to the Wi-Fi 802.11 specifications, as defined by both IEEE and Wi-Fi Alliance. UE is the 3GPP term for the portable wireless device while the term STA is used in Wi-Fi. In the following disclosure, the term wireless device will be used to mean a device operating pursuant to any 3GPP specification or similar specification, as well as pursuant to a WLAN specification, e.g. the 802.11 specifications.

As pointed above, up until now 3GPP and Wi-Fi have evolved as two separate systems, being standardized up to a great extent in isolation. However, recent activities in 3GPP and Wi-Fi Alliance, WFA, have taken the initiative to improve the interoperability of the two systems and provide mobile operators with a greater control over their "operator-deployed" WLANs.

Presently handover to or access selection of the WLAN radio access network is controlled by the wireless device, rather than by the network, due to that the WLAN network is still not sufficiently tightly integrated with the cellular networks using 3GPP technologies. However, using WLAN is from a user perspective often preferred, because of the lower cost associated with it. Therefore, an access selection of WLAN is often performed as soon as a WLAN network is detected and the signal strength is sufficiently high. Hence, when wireless device is in range of a WLAN network it will typically connect to this wireless network when the received signal strength indication, RSSI, is sufficiently high, without further analysis.

A further level of integration can be realized via access selection based on radio access network information on both 3GPP and Wi-Fi, in addition to the common authentication and user plane integration methods.

In order to achieve this functionality it is required to link or connect the wireless device context in the 3GPP RAN, which holds information about radio performance, UE mobility etc. on the 3GPP side, with the UE context in the WLAN network. This can then enable a network entity to take decisions whether the wireless device should access the WLAN network or not depending on if the wireless device is stationary, and/or has a good connection to the WLAN AP etc. The decision can then be signaled to the wireless device or executed internally in the 3GPP/WLAN network, e.g. to control admission of the wireless device to WLAN.

Known methods to support handover from "3GPP" to WLAN has the property that a relatively long time may elapse between the network commanding the wireless device to perform handover to Wi-Fi, and when the wireless device finally starts using the Wi-Fi for user plane transmission. The reason for this is lengthy procedures performed on the Wi-Fi side after the network command to move to Wi-Fi. This behavior doesn't really provide good network control as the wireless device behavior is not really predictable. Also, the situation for the wireless device may have changed once it actually starts using the Wi-Fi access.

SUMMARY

It is an object of the present disclosure to provide embodiments solving the problem of improving wireless device mobility between a first radio access network arranged to operate according to a first radio access technology and a second radio access network arranged to operate according to a second radio access technology. In particular, it is an object of the disclosure to provide embodiments that enable more reliable user plane transmission upon handover from a first radio access network to a second radio access network. The improved mobility provides for better service to wireless devices and enables better load balancing.

The object is achieved by wireless device embodiments relating to methods, wireless devices and computer programs executed in the wireless device.

An aspect of such a wireless device embodiment relates to a method in a wireless device being connected to a first radio access network that is arranged to operate according to a first radio access technology. The method enables handover to a second radio access network arranged to operate according to a second radio access technology. The wireless device receives, from a radio access node in the first radio access network, a handover prepare message; the handover prepare message including information about one or more second radio access networks selected for handover preparation. In a subsequent step, the wireless device prepares for handover to the one or more second radio access networks selected for handover. The step includes preparation signaling with at least one access point of each of the one or more second radio access networks. A preparation concluded message is compiled in the wireless device, the preparation concluded message including one or more access point identifiers identifying the at least one access point of each of the one or more second radio access networks to which wireless device has prepared for handover. The wireless device sends the preparation concluded message to the radio access node in the first radio access network.

A further aspect of such a wireless device embodiment relates to wireless device. The wireless device is connectable to a first radio access network arranged to operate according to a first radio access technology and to a second radio access network arranged to operate according to a second radio access technology. Furthermore, the wireless device is adapted to enable a handover from the first radio access network to the second radio access network. The wireless device comprises first radio circuits arranged for communication in a first radio access network and second radio circuits arranged for communication in one or more second radio access network. A handover readiness entity in the wireless device is arranged to process a handover prepare message received by the first radio circuit; the handover prepare message including information on one or more second radio access networks selected for handover preparation in the first radio access network. Furthermore, the handover readiness entity is arranged to prepare for handover to the one or more second radio access networks selected for handover preparation, wherein the preparing includes passive or active scanning for measurements, performing query signaling, authenticating, and/or associating the wireless device to the one or more second radio access networks. The handover readiness entity is also arranged to compile preparation concluded message; the preparation concluded message including at least one access point identifier identifying at least one access point of the one or more second radio access networks to which wireless device has prepared for handover. The first radio access circuits are arranged to receive the preparation concluded message from the handover readiness entity and to send the preparation concluded message.

Another aspect of such a wireless device embodiment relates to a computer program comprising computer program code that causes the wireless device to execute said method when run in said wireless device.

The introduction of a preparatory access selection method performed in the wireless device and a wireless device capable of performing such a preparatory access selection method, provides the advantage of reducing the time period to perform handover between a first and second radio access network. In accordance with aspects of the wireless device embodiments, the method also provides the opportunity for reevaluation of a decision to handover to a second radio access network close in time to performing the actual handoff. Since radio conditions in radio access networks may shift rapidly, the time period from when a decision to handover is taken to the moment when actual user plane transmission is initiated, should advantageously be kept to a minimum.

Other aspects of wireless device embodiments are consistent with the presentation in the detailed description and the claims.

The object is further achieved by radio access node embodiments relating to methods, radio access nodes and a computer programs executed in the radio access node.

An aspect of such a radio access node embodiment relates to a method in a radio access node of a first radio access network arranged to operate according to a first radio access technology. The method enables handover of a connected wireless device from the first radio access network to a second radio access network arranged to operate according to a second radio access technology.

In accordance with the method, the radio access node generates a handover prepare message; the handover prepare message including information on one or more second radio access networks selected for handover preparation in the first radio access network. The radio access node sends the handover prepare message to the connected wireless device. Subsequently, the radio access node receives a preparation concluded message from the wireless device; the preparation concluded message including one or more access point identifiers identifying an access point for each of the one or more second radio access networks to which wireless device has prepared for handover.

A further aspect of such a radio access node embodiment relates to a radio access node of a first radio access network arranged to operate according to a first radio access technology. The radio access node is adapted to enable handover of a connected wireless device from the first radio access network to a second radio access network arranged to operate according to a second radio access technology. The radio access node comprises first transceiver equipment arranged for wireless communication to one or more wireless devices connected to the first radio access network. Second transceiver equipment, comprised in the radio access node, is arranged for communication with one or more radio access points of a second radio access network. Furthermore, the radio access node comprises a handover preparation entity communicatively connected to the first and second transceiver equipment and arranged to select one or more second radio access networks for handover preparation. The handover preparation entity is further arranged to generate a handover prepare message including information on the selected one or more second radio access networks and to send the handover prepare message to the connected wireless device. The handover preparation entity is also arranged to receive a preparation concluded message; the preparation concluded message including at least one access point identifier identifying at least one access point of the one or more second radio access networks to which wireless device has prepared for handover.

Another aspect of such a radio access node embodiment relates to a computer program comprising computer program code that causes the radio access node to execute said method when run in said radio access node.

The introduction of a preparatory access selection method for access selection to an access point of a second radio access network, controlled by an access node of a first radio access network and an access node capable of controlling such a preparatory access selection method provides the advantage of reducing the time period for setting up user plane transmission in the second radio access network. In accordance with aspects of the access node embodiments, the method also provides the opportunity for performing, in the access node, a reevaluation of a decision to handover to a second radio access network close in time to performing the actual handoff. Since radio conditions in radio access networks may shift rapidly, the time period between a decision to handover and the moment when actual user plane transmission is initiated, should advantageously be kept to a minimum.

Other aspects of radio access node embodiments are consistent with the presentation in the detailed description and the claims.

Accordingly, the disclosed embodiments enhance wireless device mobility between a first radio access network arranged to operate according to a first radio access technology and a second radio access network arranged to operate according to a second radio access technology. In particular, the disclosure enables real time initiation of user plane transmissions, i.e. enabling a short and predictable time for actual user plane transmission transfer from a first to a second radio access network. A particular advantage with embodiments of the disclosure is that it introduces the possibility to reevaluate a decision to handover from a first to a second radio access network; allowing second thoughts prior to transfer. Advantageously, further reporting from a wireless device may then be taken into account as well information directly from the second radio access, e.g on altering load or other changes in the traffic situation.

The disclosed embodiments relating to wireless devices and radio access nodes are beneficial when the first radio access network is a long term evolution, LTE, network and the second radio access network is a wireless local area network, WLAN.

BRIEF DESCRIPTION OF THE DRAWINGS

The present technique will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The general idea of the disclosure is to prepare a wireless device for future handovers, by sending an instruction to prepare for handover to one or several access points. This makes it possible for the wireless device to prepare for handover so that the actual handover is performed within a shorter and more predictable timespan when ordered.

Embodiments of the present disclosure relate, in general, to the field of 3GPP and wireless local area network, WLAN. However, it must be understood that the same principles are applicable in any communication system where a wireless device connected to a first radio access network seeks to connect to a second radio access network.

Even though the present disclosure describes the situation where an access node of a 3GPP network controls the offloading towards an access point of a WLAN, it is of course similarly possible to reverse the situation and allow the WLAN access point to control a decision to offload to an access node of a LTE network. The invention should not be restricted to only one of the directions.

In order to achieve good support for network-controlled WLAN/3GPP access selection or handover, the wireless device context in the 3GPP RAN is linked with the device context in the WLAN. The further description is based on the presumption that determination when to associate a wireless device to the WLAN is controlled by the 3GPP RAN. However, as mentioned above, control in the opposite direction would also be within the scope of the disclosure. It is also presumed that the wireless device has information relating to the availability of different radio access technologies and networks in the vicinity of the wireless device.

Figure 1:
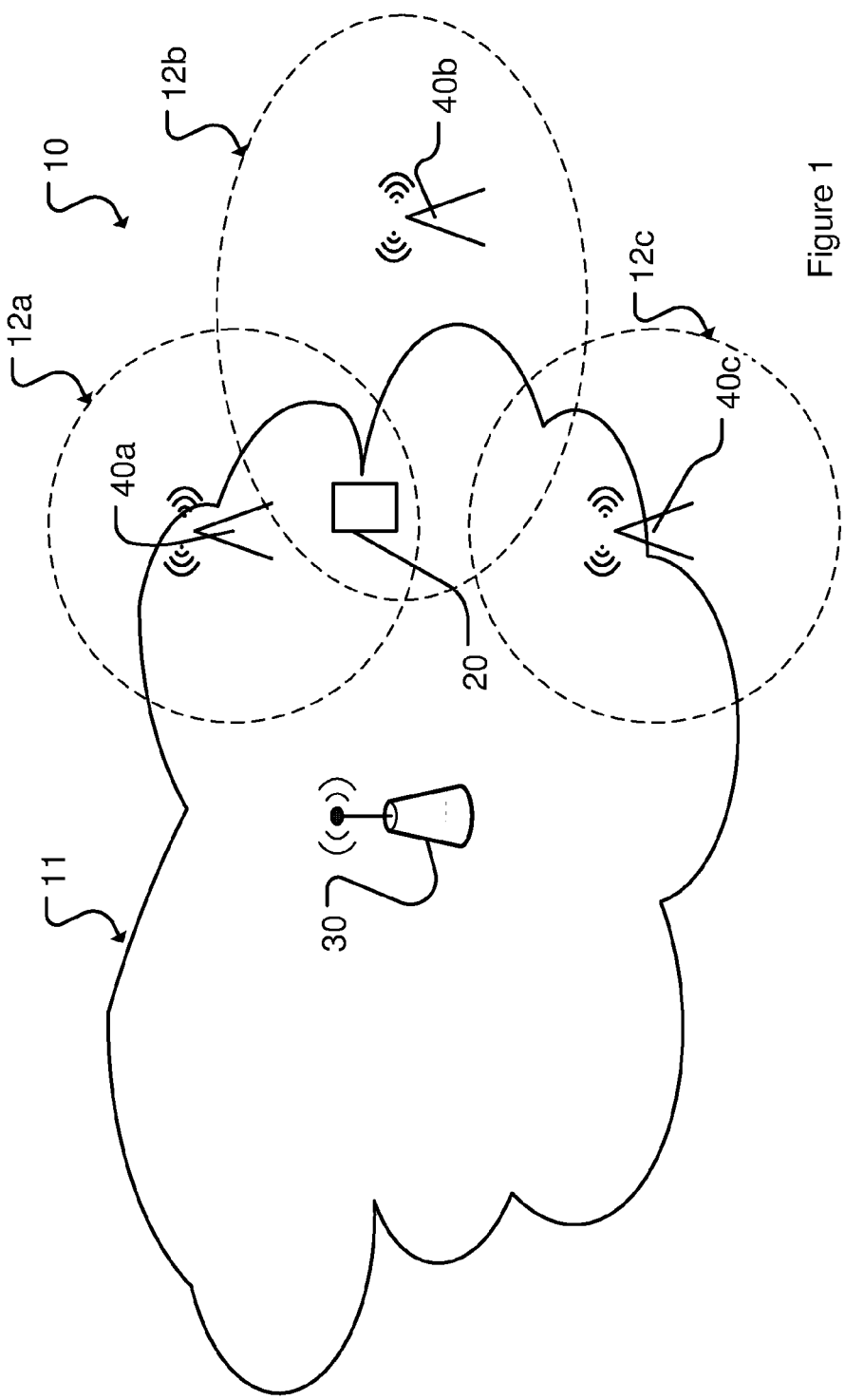
FIG. 1 schematically illustrates a mobile communication network including WLAN cells.

FIG. 1 schematically illustrates a mobile communication network 10. The network 10 comprises a wireless device 20, a first radio access network 11, preferably configured as a 3GPP radio access network, 3GPP RAN, and second radio access networks 12a-c, preferably configured as a wireless local area network, WLAN. In the illustrated example, the wireless device 20 is connected to the cellular network 11 via a radio access node 30. The wireless device 20 is also within the range of wireless local area networks 12a,b having radio access points 40a,b.

Figure 4:
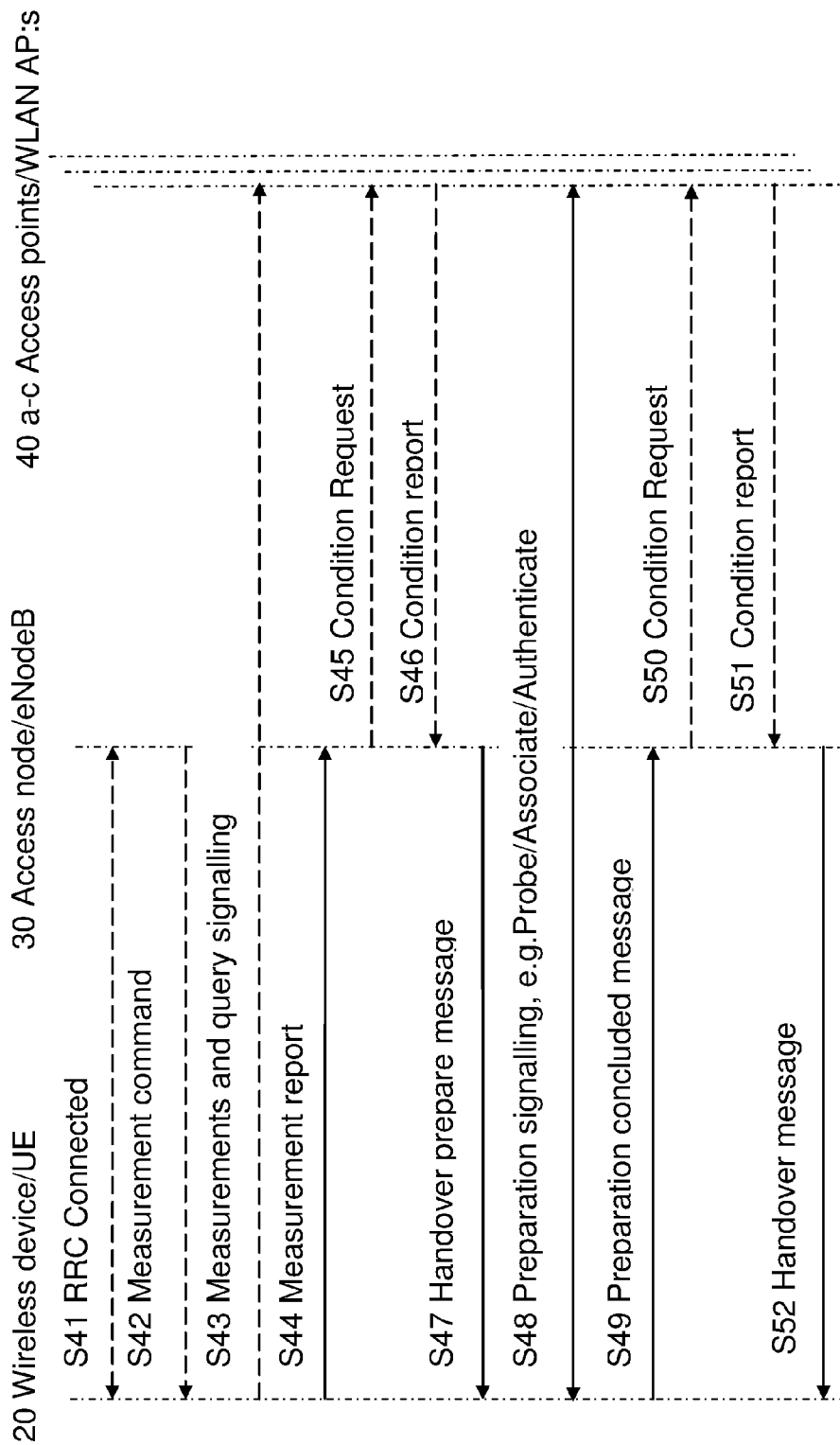
FIG. 4 is a message sequence chart illustrating messaging between a wireless device, a radio access node of a first radio access network and a radio access point of a second radio access network.

FIG. 4 is a message sequence chart illustrating messaging between the wireless device 20, the radio access node 30, e.g an eNodeB, and radio access points 40a-c, e.g. WLAN AP:s, when executing the disclosed methods of enabling handover. With the illustrated starting point S41, the wireless device is in a Radio Resource Control, RRC, connected state with signaling connection to the access node 30, e.g an eNodeB wherein a mobility selection entity, e.g. a Radio Access, Frequency and Cell, RAFC, mobility selection entity is responsible for all mobility decisions including mobility of the wireless device from the first radio access network to a second radio access network according to existing mobility principles as defined in 3GPP for Intra-3GPP mobility. The wireless device 20 receives a measurement command S42 from the access node 30 to trigger measurements and search for a radio resource in the second radio access network, in the following denoted carrier Wi-Fi. The mobility selection entity of the eNodeB has information on the WLAN environment, thus the measurement command includes information identifying one or more carrier Wi-Fi:s for which measurements should be conducted. The decision to make the wireless device start searching for "Carrier Wi-Fi" is sent to the wireless device as a measurement command S42, e.g as a RRC Measurement Configuration message. The "Carrier Wi-Fi" could be identified by access point identifiers e.g. SSID, a range of SSIDs and/or PLMN-ID or even by unique access point identifiers such as the BSSID. The measurement command S42 could also include some RSSI conditions, e.g. the radio signal strength received by the wireless device from the access point, or other access point information, e.g. access point load related information as received from the Wi-Fi APs as part of a BSS Load or WAN Metrics information using either WLAN 802.11 signaling or Access Network Query Protocol, ANQP, signaling as defined by WFA in the HotSpot 2.0 specifications. In addition, the command may include information to be reported by the wireless device in an optional measurement report S44, RRC Measurement Report. The measurement command is received in the wireless device. In a wireless device having a 3GPP-side and a Wi-Fi part, a UE/STA configuration, the command is passed internally to the Wi-Fi part of the UE/STA. Following receipt of the measurement command S42, the wireless device starts acting according to the instructions included in the measurement command. This includes actions taken by the Wi-Fi radio transceiver circuits. The wireless device detects one or more WLAN AP:s that matches the access point identifiers provided in the measurement command and possible other conditions like RSSI and/or WLAN load. In an embodiment of the disclosure, the wireless device performs measurements and query signaling S43, e.g. WLAN measurement and optional ANQP signaling. The WLAN measurement can take place by the wireless device receiving an 802.11 Beacon message from WLAN AP:s (if passive scanning is applied) and/or the wireless device transmitting a 802.11 Probe Request (if active scanning is applied) to the WLAN AP:s that will respond with a 802.11 Probe Response message. Both the active and passive scanning enable to wireless device to evaluate the RSSI conditions (if included in the measurement command as conditions) and to receive other information from the WLAN AP:s, such as the SSID. In addition the wireless device may perform ANQP signaling to the WLAN AP:s (to the AP:s that pass a possible initial evaluation) to verify a PLMN-ID and/or to retrieve any information (such as the WAN Metrics information) to be reported in the Measurement Report S44. It may be beneficial to avoid performing the ANQP signalling, when seeking to achieve a fast measurement report.

The wireless device sends the measurement report S44 to the eNodeB and the mobility selection entity of the eNodeB. Internally within the wireless device, the measurement report is sent from the Wi-Fi side of the UE/STA to the 3GPP side that then sends it to the network. The measurement report contains some unique identifier of the one or more AP:s, e.g. the BSSID:s, and possibly N number of best APs in ordered list or with measurement results and other information as configured initially in the Measurement Command S42. The number of N can also be included in the Measurement Command S42.

Optional network side signaling can take place towards the WLAN:s handling the identified AP:s, possibly based on e.g. DNS lookup on the unique identifiers of the one or more AP:s, e.g. the BSSID:s plus other information as illustrated by the condition request S45 and the condition report S46 from the WLAN AP:s.

A decision is formed within the eNodeB to prepare the move of the wireless device to the identified one or more Wi-Fi carrier. The decision is based primarily on received information from the terminal but also information and measurements in network side are also taken into in accordance with embodiments of the disclosure following condition request S45 and condition report S46 signaling with the WLAN AP:s. The decision made by the network to prepare for a move is sent to the wireless device in a handover prepare message S47. If the network decision is to not move traffic to WLAN then no change is needed and hence no need to send a handover prepare message S47.

The handover prepare message S47 is sent to the wireless device, the handover prepare message S47 including information of one or more WLAN AP:s for which the handover preparations is to be conducted. The WLAN AP:s are preferably identified with BSSID, but other type of identification of the WLAN AP:s in the handover prepare message is also within the scope of the invention. The handover prepare message S47 is received in the 3GPP-side of the UE and passed internally to the Wi-Fi part of the UE/STA. The received handover prepare message S47 triggers the UE/STA to start preparing the move to the WLAN. The UE/STA performs needed WLANprocedures (as defined for example by IEEE in the 802.11 specifications and by WFA in the HotSpot 2.0 specifications) by means of preparation signaling S48 sent to the one or more identified WLAN AP:s. Such preparation signaling comprises passive and active scanning for measurements, performing query signaling, e.g. ANQP signaling, authentication, open authentication and/or EAP authentication, and/or association. The UE/STA doesn't yet start active user plane transmission on the Wi-Fi side.

When the handover preparation is concluded in the wireless device, a preparation concluded message S49 is sent from the wireless device to the mobility selection entity of the eNodeB 30.

The message contains unique identifiers, e.g BSSID:s of the one or more AP:s for which the wireless device has performed a handover preparation and optionally fresh measurement report. The message may also contain a UE/STA specific "UE handover identifier" that has either been selected by the UE/STA or communicated to the AP, or a value selected by the AP and communicated to the UE/STA. A good option for the latter case would be to use the Association ID (AID) of the STA, at least partly. The AID is assigned by the AP to each STA and could be used for example as the "UE handover identifier" as is or it could be combined with the UE WLAN MAC address. The "UE handover identifier" will create a binding between UE in 3GPP and STA in WLAN, since the globally unique identifier IMSI is not always available, e.g in the eNodeB.

Optional network side signaling, as illustrated by the condition request S50 and the condition report S51 can take place from the eNodeB towards the identified WLAN AP:s, e.g. retrieving the "BSS Load" and "WAN metrics" information. If the "UE handover identifier" was included in the preparation concluded message S49, this can be also used between the eNB and the Wi-Fi side to retrieve UE-specific information (e.g. WLAN capabilities of the UE or radio link quality). Still another option would be to provide the information as part of the preparation concluded message. This may need additional communication between the UE/STA and the AP during the preparation signaling S48, for example so that the UE/STA can receive the uplink radio measurements made by the AP side for inclusion in the preparation concluded message S49 towards the eNodeB.

Following receipt of a preparation concluded message S49 and the optional condition report S51, the mobility selection entity is capable of deciding on an actual handover of the wireless device from the eNodeB to a WLAN AP. The handover message S52 is received in the wireless device that performs the final steps needed to enable user plane transmission using WLAN. In the previously disclosed dual mode wireless device, the message is received in the 3GPP-side of the UE and passed internally to the Wi-Fi part of the UE/STA. The final steps performed in the wireless device could consist of retrieving of an IP-address for example by using "DHCP" related steps or "S2a mobility" related steps as to be standardized as part of SaMOG phase 2 (SaMOG stands for "S2a mobility based on GTP" and is an ongoing work in the SA2 working group in 3GPP). The DHCP step could in some cases be performed already during preparation performed by the wireless device following receipt of the handover prepare message S47 depending on which actions it will result on the network side, e.g. the behavior according to the current S2a specifications could result in the PGW signaling the GTP-U tunnel move towards the SGW and MME and making the UE to get detached.

Following the user plane transmission set up to the one or more WLAN AP:s, the UE will currently get detached from the eNodeB if the connection moved from 3GPP to WLAN was the only connection. However in order to enable a more fast move back to 3GPP, a handover preparation as disclosed could also be performed from a controlling WLAN AP. Other options includes maintaining a handover readiness in the eNodeB following handover of user plane transmission to the one or more WLAN AP:s.

The message sequence including signaling and steps described with reference to FIG. 4, reflects a new procedure for handover of wireless device communication from an access node in a first access network to an access point of a second radio access network, the new procedure involving a handover preparation phase in which a controlling access node of a first radio access network, here exemplified with an eNodeB including a mobility selection entity in a 3GPP network, commands a wireless device to start preparing an access attempt in a second radio access network, here exemplified by a WLAN. The procedure and associated equipments involves wireless device embodiments and access node embodiments that will now be described with reference to FIGS. 2a-c and FIG. 3a-b.

Figure 2A:
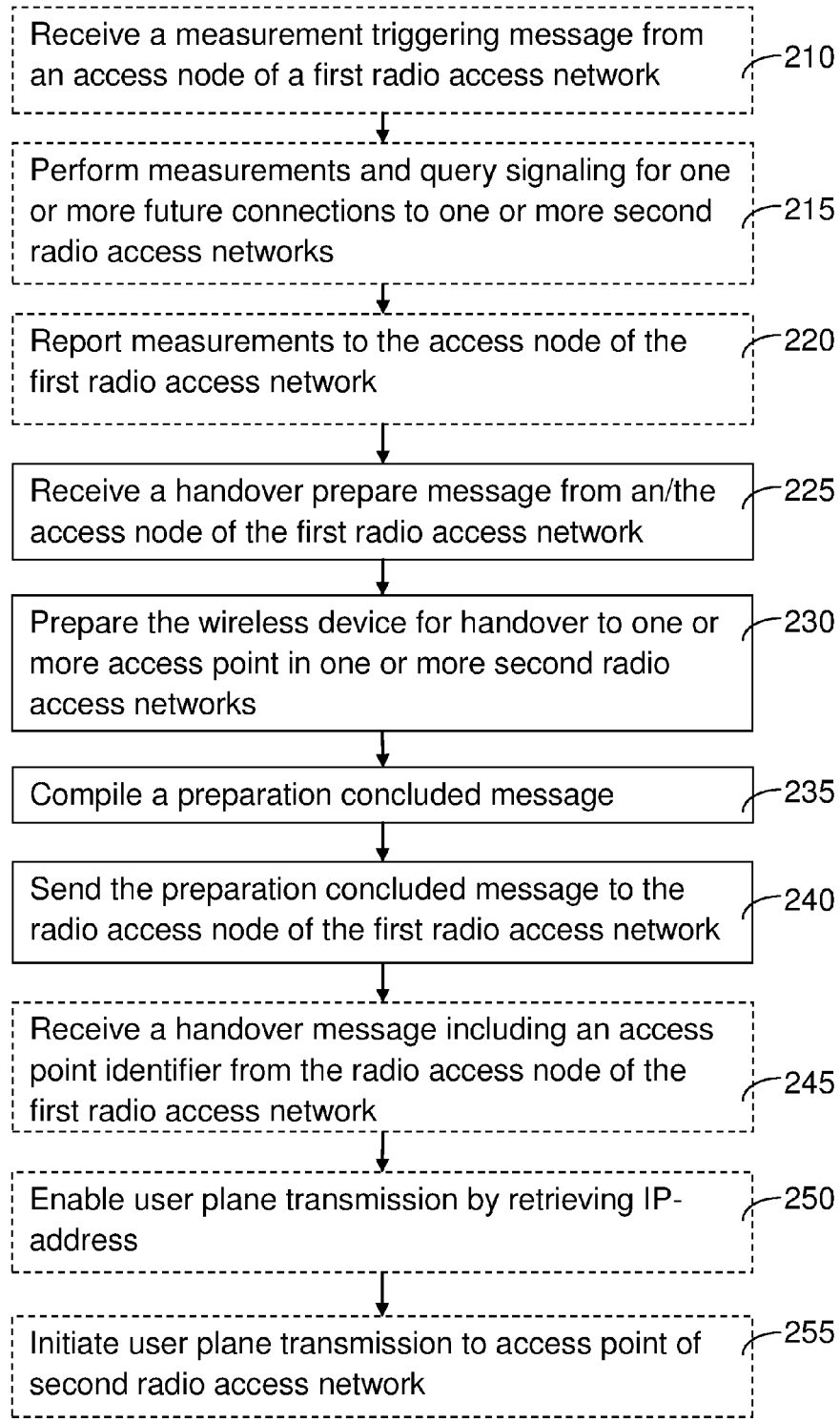
FIG. 2
a. schematically illustrates a flow chart of a method in a wireless device
b. schematically illustrates a flow chart of aspects of a method in a wireless device
c. schematically illustrates a block diagram of a wireless device.

FIG. 2a schematically illustrates a flow chart of a method in a wireless device 20. At a starting point for the disclosed method, the wireless device 20 is connected to a radio access node 30, e.g. an eNodeB, of first radio access network operating according to a first radio access technology, e.g. a 3GPP RAT. The disclosed method enables handover to one or more second radio access networks 12a-c operating according to a second radio access technology, e.g a WLAN/Wi-Fi network. The wireless device, receives in step 225, a handover prepare message S47 from an access node of the first radio access network, e.g from a mobility selection entity in the eNodeB of a 3GPP network wherein the mobility selection entity has a Radio Access, Frequency and Cell, RAFC mobility selection function. The handover prepare message includes information about one or more second radio access networks, WLAN:s 12a-c, selected for handover preparation. As disclosed with reference to the message sequence, the handover prepare message is received in the wireless device and passed internally from a 3GPP side of the wireless device to a WLAN side when the wireless device includes dedicated sides for the different radio access technologies.

In a further step 230, the wireless device prepares for handover to the one or more second radio access networks selected for handover, e.g. selected by access point identifiers in the handover prepare message S47. The step 230 of preparing the wireless device for handover includes preparation signaling S48 with at least one access point of each of the one or more second radio access networks selected in the handover prepare message.

Figure 2B:
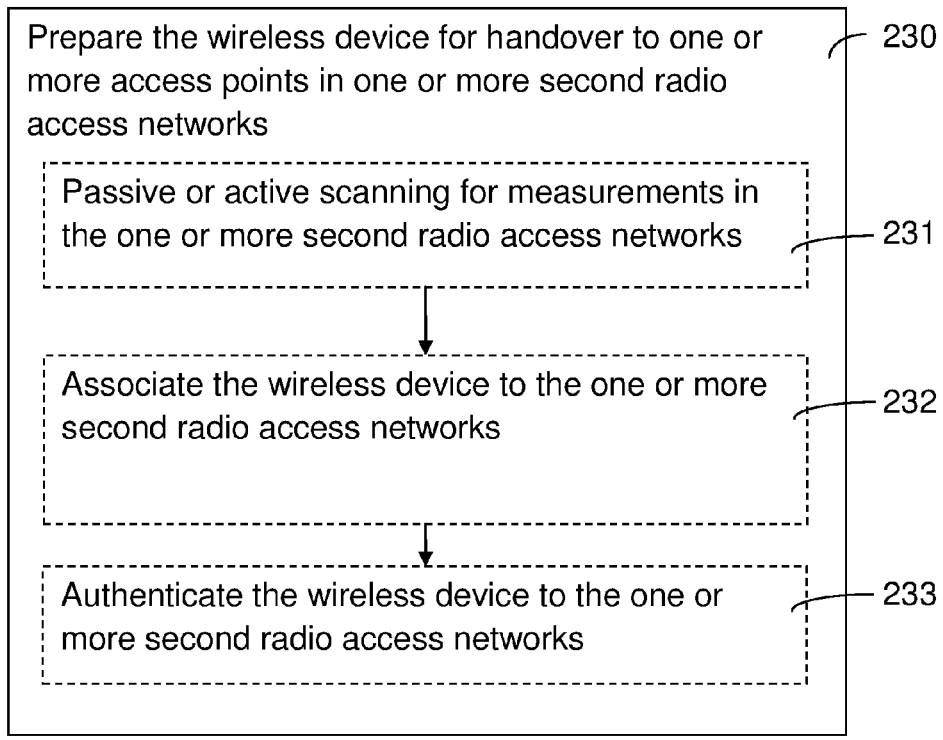

As further detailed in FIG. 2b, the step of preparing the wireless device for handover to one or more access points in one or more second radio access networks involves different aspects of 802.11 procedures. The object of the preparation is to prepare a future connection, so that the actual connection may be established faster, once the handover decision is taken.

According to an aspect of the disclosure, the step of preparing 230 the wireless device for handover to the one or more second radio access networks selected for handover includes initial WLAN communication 231 that contains different sub-steps. The first one is either passive or active scanning as described earlier to the one or more second radio access networks. This sub-step is used by the wireless device to retrieve different information related to the access points in the second radio access networks and enables the wireless device to proceed with both open system authentication and the association procedure as defined in IEEE 802.11 (that are also part of the initial WLAN communication 231).

According to a further aspect of the disclosure, the step of preparing 230 the wireless device for handover to the one or more second radio access networks selected for handover includes associating 232 the wireless device to the one or more second radio access networks.

According to another aspect of the disclosure, the step of preparing 230 the wireless device for handover to the one or more second radio access networks selected for handover includes authenticating 233 the wireless device to the one or more second radio access networks. The authentication may be (U)SIM-based authentication such as EAP-SIM/AKA/AKA'. This implies that authentication information is exchanged between the wireless device and one or several of the second radio access networks. Hence, no time is wasted for authentication once a handover is executed.

Following the preparation for handover, the wireless device compiles a preparation concluded message S49 in step 235. The preparation concluded message includes one or more access point identifiers that are unique identifiers of the access points, e.g. BSSID:s. The identifiers represent and identify each of the access points for which the wireless device has concluded a handover preparation.

The wireless device informs the controlling access node, e.g. the mobility selection entity of the eNodeB, of the concluded handover preparation is concluded by sending the preparation concluded message to the access node in step 240. By sending this message the wireless device informs the controlling access node that it is ready to handover to one or several second radio access networks. This concludes the handover preparation phase of the improved handover procedure. A handover may now be made to one of the access nodes, for which the wireless device has prepared for handover. Because the wireless device have prepared for such a handover, the handover time is then decreased.

According to further aspects, the disclosure also relates to the actual handover from the access node 30 of the first radio access network 11, to an access point of a second radio access network. Following receipt of a handover message S52 in step 245, the wireless device enables user plane transmission step 250, retrieving an IP address of the radio access point indicated by an access point identifier included in the handover message S52. The user plane transmission is initiated in step 255.

According to an aspect of the disclosed wireless device method embodiment, the wireless device initially receives 210 a measurement triggering message, a measurement command S42, from the access node 30 of the first radio access network 11. Following receipt of such a measurement triggering message, the wireless device performs measurements and query signaling 215 for one or more future radio connections to one or more second radio access networks 12a-c, e.g. WLAN measurements and ANQP signaling. The result of such measurements is, in step 220, sent to the radio access node 30 in a measurement report S44 to the radio access node 30.

The handover prepare message could, according to an aspect of the disclosure include an access point identifier for an access point in each second radio access network selected for handover preparation. The access point identifier is selected to be unique identifier of the WLAN AP, e.g. a BSSID.

In addition to the one or more access point identifiers included in the preparation concluded message S49, the message also includes one or more fresh measurement report relating to the access points identified by the access point identifiers in the preparation concluded message S49 according to an aspect of the disclosure. The message may also contain a wireless device handover identifier that has either been selected by the wireless device or communicated to the one or more access points or a value selected by an access point and communicated to the wireless device. Such a wireless device handover identifier creates a binding between the wireless device in the 3GPP network and the WLAN.

According to a further aspect of the disclosure, one or more access point identifiers are included in the preparation concluded message. The included access point identifiers represent access points of each of the second radio access networks to which handover preparation has been performed.

Figure 2C:
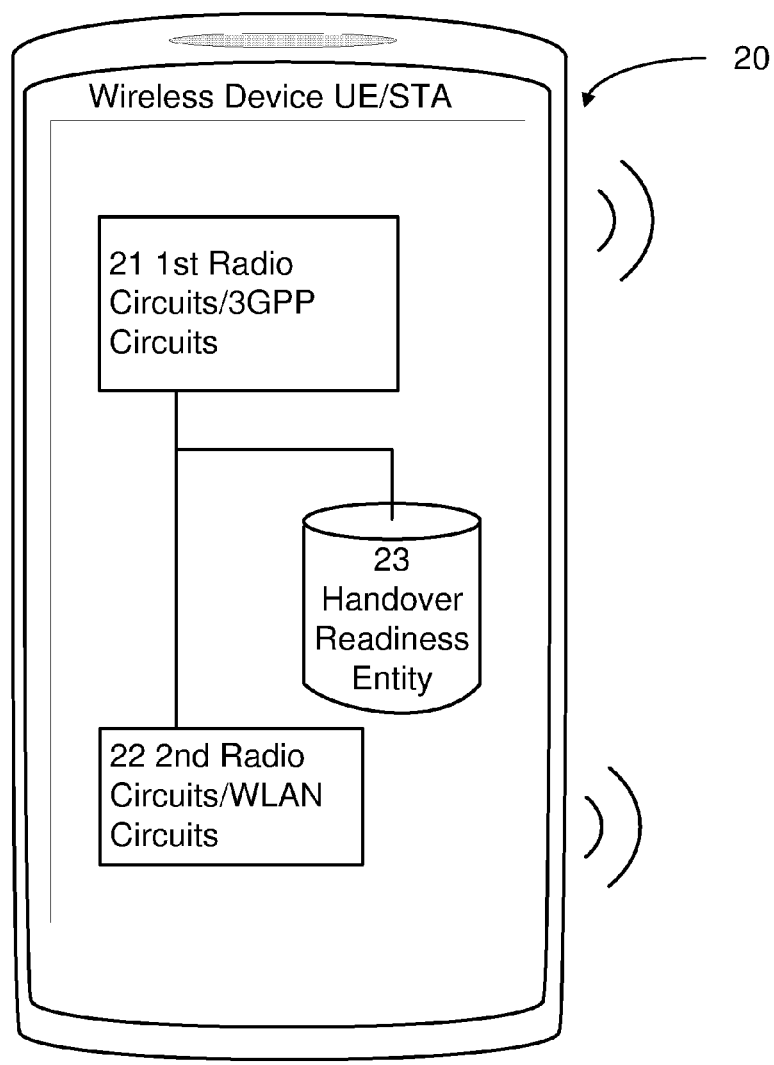

FIG. 2c schematically illustrates a block diagram of a wireless device 20. The wireless device 20 includes first radio circuits 21 arranged for communication in a first radio access network, e.g radio circuits for 3GPP RAT and second radio circuits 22 arranged for communication in a second radio access network, e.g. radio circuits for WLAN RAT. The wireless device including these two sets of radio circuits 21, 22 is connectable to a first radio access network 11 arranged to operate according to a first radio access technology and to a second radio access network 12 arranged to operate according to a second radio access technology. The wireless device is also capable of enabling handover from the first radio access network to a second radio access network. The previously disclosed handover prepare procedure is controlled by a handover readiness entity 23. The handover readiness entity 23 processes a handover prepare message S47 received by the first radio circuits 21. The handover readiness entity 23 retrieves information on one or more second radio access networks selected for handover preparation in the first radio access network. The information is retrieved from the handover prepare message. The handover readiness entity 23 is further arranged to prepare for handover to the one or more second radio access networks selected for handover preparation. The preparing includes passive or active scanning for measurements, performing query signaling, e.g. ANQP, authenticating, and/or associating the wireless device to the one or more second radio access networks. The handover readiness entity 23 is further arranged to compile a preparation concluded message S49, the preparation concluded message including at least one access point identifier identifying at least one access point of the one or more second radio access networks to which wireless device has prepared for handover. The preparation concluded message is communicated internally within the wireless device, e.g. from a WLAN side of the wireless device to a 3GPP side of the device, whereupon the first radio access circuits are arranged to send the preparation concluded message to a receiving radio access node, e.g. an eNodeB of a 3GPP network.

Figure 3B:
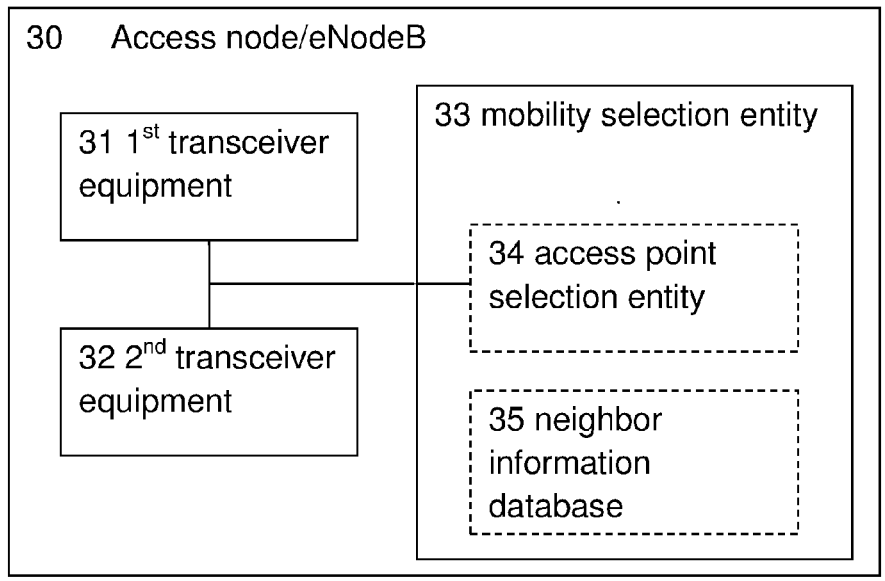
FIG. 3
a. schematically illustrates a flow chart of a method in a radio access node
b. schematically illustrates a block diagram of a radio access node.
Figure 3A:
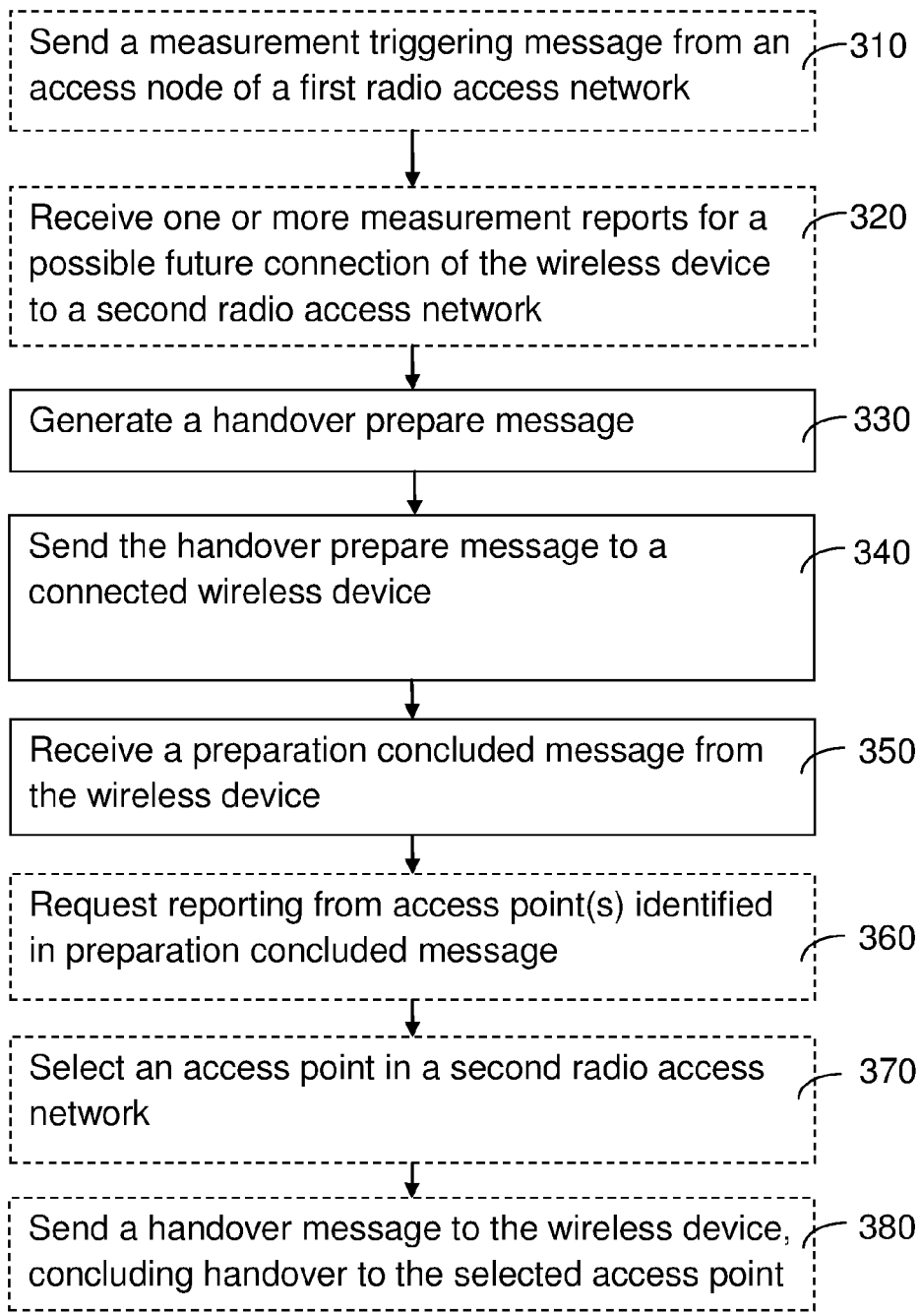

FIG. 3a schematically illustrates a flow chart of a method in a radio access node embodiment. The radio access node 30 controls communication of a wireless device in a first radio access network 11 arranged to operate according to a first radio access technology. The flow chart schematically illustrates a method of enabling handover of a wireless device 20 connected to the radio access node 30 of the first radio access network 11 to an access point 40 of a second radio access 12 network (e.g. to access point 40a of a second radio access network 12a) arranged to operate according to a second radio access technology. The radio access node having the connection to the wireless device generates, in step 330, a handover prepare message S47. The handover prepare message is an instruction to the wireless device, that it shall prepare for handover. The handover prepare message includes information about one or more second radio access networks, e.g. by access point identifiers to a respective access point in each second radio access network selected for handover preparation. In step 340, the handover prepare message is sent to the connected wireless device, the handover prepare message includes information about one or more access points that are considered for handover in one or more second radio access networks. In this way the radio access node may prepare a wireless device for a future handover. When receiving the handover prepare message, the wireless device prepares for handover for example as described in connection to FIG. 2a.

In step 350, the access node receives a preparation concluded message S49 from the wireless device, the preparation concluded message including one or more access point identifiers identifying an access point for each of the one or more second radio access networks to which wireless device has prepared for handover.

The time interval from the handover prepare message S47 to the preparation concluded message S49 could amount to a few seconds which is a significant amount of time when considering radio transmission and mobility aspects. According to an aspect of the disclosure, the preparation concluded message may include additional measurement reports from the wireless device that enables the access node to make a more informed handover decision.

With the information from the preparation concluded message S49, the access node 30 selects, in step 370, an access point in a second radio access, the access point being selected from the access point identifiers. According to an aspect of the disclosure, the access node requests reporting 360 from the identified access points, e.g. by retrieving the "BSS Load" and "WAN metrics" information, prior to the step of selecting an access point in a second radio access network. Following a selection of an access point, the handover is concluded by sending a handover message S52 in step 380.

According to aspects of the method in the access node, the method also includes the step 310 of sending a measurement triggering message to a connected wireless device. One or more measurement reports from the wireless device relating to one or more possible future connections of the wireless device to a second radio access network are received in the access node in step 320. The result of these measurement reports are used when selecting access points for the subsequent handover preparation.

FIG. 3b schematically illustrates a block diagram of a radio access node 30 including first transceiver equipment 31 arranged for communication to one or more wireless devices 20 connected to the radio access node 30. The radio access node also includes second transceiver equipment 32 arranged for communication with one or more radio access points 40a-c of a second radio access network 12. The radio access node is arranged to enable access to a first radio access network arranged to operate according to a first radio access technology and to enable handover of a connected wireless device to a second radio access network 12 arranged to operate according to a second radio access technology. In addition to the first and second transceiver equipments 31, 32, the radio access node comprises a mobility selection entity 33 communicatively connected to the first transceiver equipment 31 and the second transceiver equipment 32 and arranged to select one or more second radio access networks 12a-c for handover preparation and to generate a handover prepare message S47 including information on the selected one or more second radio access networks 12a-c. The handover preparation entity is further arranged to forward the handover prepare message S47 to the 1$^{st}$ transceiver equipment 31 for sending to the connected wireless device. The 1$^{st}$ transceiver 31 is arranged to receive a preparation concluded message S49 and to forward the message to the mobility selection entity 33, the preparation concluded message S49 including at least one access point identifier identifying at least one access point of the one or more second radio access networks to which wireless device has prepared for handover.

According to an aspect of a radio access node embodiment, the radio access node, further includes access point selection entity 34 arranged to select an access point for handover of the connected wireless device, the access point selected from the one or more access points identified by the access point identifiers in the preparation concluded message S49. Information on the receipt of the preparation concluded message S49 or the actual preparation concluded message S49 is forwarded from the mobility selection entity 33 to the access point selection entity 34 that takes the actual handover decision. In accordance with a further aspect, access point selection entity 34 is arranged to evaluate second radio access network measurement reports included in the preparation concluded message, e.g the optional network side signaling including a condition request S50 sent from the radio access node to one or more access points and a condition report(s) S51 received in response of the condition request S50, e.g retrieving "BSS Load" and "WAN metrics" information. Based on the report(s), the access point selection entity 34 selects access point for handover of the connected wireless device.

According to an additional aspect, the radio access node 30 includes a neighbor information database 35 arranged to store information on one or more second radio access networks within a coverage area of the first radio access network 11 and eligible for handover from the first radio access network 11. Information from this neighbor information database 35 is used to determine radio access points to be considered in the handover preparation performed by the connected wireless device 20.

Even though the embodiment describes the situation where a 3GPP RAT entity controls the offloading towards a WLAN RAT entity, it is of course similarly possible to reverse the situation and allow a WLAN RAT entity controlling the decision to offload to 3GPP RAT entity. The invention should not be restricted to only one of the directions.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed repeatedly.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method for enabling handover of a device connected to a first radio access network (RAN) operating according to a first radio access technology (RAT) to a wireless local area network (WLAN) operating according to a second RAT that is different than the first RAT, wherein the WLAN includes a WLAN access point (AP), the method comprising:
   the wireless device receiving from a radio access node in the first RAN a measurement command, the measurement command including information identifying the WLAN;
   after receiving the measurement command, the wireless device detecting the WLAN AP;
   after detecting the WLAN AP, the wireless device transmitting a measurement report to the radio access node, the measurement report comprising an identifier identifying the detected WLAN AP and measurement information related to the WLAN AP;
   after transmitting the measurement report, the wireless device receiving a handover prepare message transmitted by the radio access node, the handover prepare message comprising information identifying the WLAN AP and being configured to trigger the wireless device to start preparing for a handover to the WLAN AP;
   in response to receiving the handover prepare message, the wireless device preparing for the handover to the WLAN AP, wherein the preparing step includes the wireless device signalling with the WLAN AP;

the wireless device generating a preparation concluded message after preparing for the handover to the WLAN AP, wherein the preparation concluded message includes an identifier identifying the WLAN AP to which wireless device has prepared for the handover, and prior to executing the handover, sending the preparation concluded message to the radio access node in the first radio access network.

2. The method of claim 1, wherein the preparing step further comprises passive or active scanning for measurements in the WLAN.

3. The method of claim 1, wherein the preparing step further comprises associating the wireless device to the WLAN.

4. The method of claim 1, wherein signalling with the WLAN AP comprises transmitting to the WLAN AP authentication information for authenticating the wireless device to the WLAN.

5. The method of claim 1, wherein the preparation concluded message further includes a measurement report relating to the WLAN AP.

6. The method of claim 1, wherein the handover prepare message further comprises information about a third radio access network selected for handover preparation, said third radio access network operating according to a third RAT that is different than the first RAT, the preparing step further includes signalling with a second access point of the third radio access network, and the preparation concluded message further comprises a second access point identifier identifying the second access point of the third radio access network to which wireless device has prepared for the handover.

7. The method of claim 6, further including receiving a handover message from the radio access node of the first RAN, the handover message including a selected access point identifier selected from a set of access point identifiers including the identifier identifying the WLAN AP and the second access point identifier, enabling user plane transmission by retrieving an IP-address allocated to the access point identified by the selected access point identifier, and initiating user plane transmission to the access point identified by the selected access point identifier.

8. The method of claim 1, further including receiving a measurement triggering message from the radio access node of first radio access network, obtaining a measurement for a possible future connection to the WLAN, and reporting to the radio access node of the first radio access network the measurement and the identifier identifying the WLAN AP.

9. The method of claim 1, further comprising:

the wireless device commencing user plane transmission with the WLAN AP; and after user plane transmission with the WLAN AP has begun, the wireless device maintaining communication with the radio access node to maintain a state of handover readiness, the state of handover readiness configured to facilitate a handover of the wireless device from the WLAN to the first radio access network.

10. The method of claim 1, further comprising:

after sending the preparation concluded message to the radio access node in the first radio access network, the wireless device receiving from the radio access node a handover over message; and the wireless device, in response to receiving the handover message, enabling user plane transmissions via the WLAN, wherein enabling user plane transmission via the WLAN comprises the wireless device obtaining an Internet Protocol (IP) address.

11. The method of claim 10, wherein obtaining the Internet Protocol (IP) address comprises the wireless device using the Dynamic Host Configuration Protocol (DHCP) to obtain the IP address.

12. The method of claim 1, further comprising:

prior to sending the preparation conclude message, the wireless device receiving from the WLAN AP an identifier assigned to the wireless device by the WLAN AP, the assigned identifier for use in identifying the wireless device, wherein the preparation concluded message further comprises the assigned identifier.

13. The method of claim 12, wherein the identifier assigned to the wireless device by the WLAN AP is an Association Identifier (AID).

14. The method of claim 1, further comprising:

prior to sending the preparation conclude message, the wireless device selecting a handover identifier; and the wireless device sending the selected handover identifier to the WLAN AP, wherein the preparation concluded message further comprises the selected handover identifier.

15. A wireless device, the wireless device comprising:

first radio circuits arranged to operate according to a first radio access technology (RAT);

second radio circuits arranged to operate according to a second RAT that is different than the first RAT; and a processing unit comprising one or more processors, the processing unit being configured to control the wireless device to perform the following steps:

processing a measurement command received from a radio access node in a first radio access network (RAN), the measurement command including information identifying a wireless local area network (WLAN) operating according to the second RAT;

detecting an WLAN access point (AP);

after detecting the WLAN AP, transmitting a measurement report to the radio access node, the measurement report comprising an identifier identifying the detected WLAN AP and measurement information related to the WLAN AP;

after transmitting the measurement report, receiving a handover prepare message transmitted by the radio access node, the handover prepare message comprising information identifying the WLAN AP and being configured to trigger the wireless device to start preparing for a handover to the WLAN AP;

in response to receiving the handover prepare message, preparing for the handover to the WLAN AP, wherein the preparing step includes signalling with the WLAN AP;

generating a preparation concluded message after preparing for the handover to the WLAN AP, wherein the preparation concluded message comprises an identifier identifying the WLAN AP, and prior to executing the handover, sending the preparation concluded message to the radio access node in the first radio access network.

16. A computer program product comprising a non-transitory computer readable medium storing a computer program comprising computer program code which, when executed in a wireless device, causes the wireless device to execute the method of claim 1.

17. A method in a radio access node of a first radio access network (RAN) arranged to operate according to a first radio access technology (RAT) of enabling handover of a connected wireless device from the first RAN to a wireless local area network (WLAN) arranged to operate according to a second RAT that is different than the first RAT, wherein the WLAN includes a WLAN access point (AP), the method comprising:
- transmitting to the wireless device a measurement command, the measurement command including information identifying the WLAN;
- receiving from the wireless device a measurement report, the measurement report comprising information identifying the WLAN AP and measurement information related to the WLAN AP;
- after receiving the measurement report, generating a handover prepare message, the handover prepare message comprising the information identifying the WLAN AP and being configured to trigger the wireless device to start preparing for a handover to the WLAN AP;
- sending the handover prepare message to the connected wireless device;
- receiving a preparation concluded message from the wireless device, the preparation concluded message includes an identifier identifying the WLAN AP to which the wireless device has prepared for the handover; and
- in response to receiving the preparation concluded message from the wireless device and prior to execution of the handover to the WLAN AP, sending a handover message to the wireless device indicating that the wireless device should execute the handover to the WLAN AP.

18. The method of claim 17, further including:
- transmitting to at least one AP in the WLAN a message comprising a request to report metrics related to the operation of the at least one AP.

19. The method of claim 17, further including:
- selecting an AP in the WLAN, the access point being selected from one or more AP identifiers received from the wireless device.

20. A non-transitory computer-readable medium comprising computer program code which, when executed in a radio access node, causes the radio access node to execute the method of claim 17.

21. The method of claim 17, further comprising:
- after transmitting the handover message, maintaining a state of handover readiness, the state of handover readiness configured to facilitate a handover of the wireless device from the WLAN AP to the node of the first radio access network.

22. A radio access node of a first radio access network (RAN) arranged to operate according to a first radio access technology (RAT), wherein the radio access node is adapted to enable handover of a connected wireless device from the first RAN to a wireless local area network (WLAN) arranged to operate according to a second RAT that is different than the first RAT, the radio access node comprising:
- first transceiver arranged for wireless communication to one or more wireless devices connected to the first RAN;
- a processing unit comprising one or more processors, the processing unit being configured to control the radio access node to perform a method comprising the following steps:
- transmitting to the wireless device a measurement command, the measurement command including information identifying the WLAN;
- receiving from the wireless device a measurement report, the measurement report comprising information identifying the WLAN AP and measurement information related to the WLAN AP;
- after receiving the measurement report, generating a handover prepare message, the handover prepare message comprising the information identifying the WLAN AP and being configured to trigger the wireless device to start preparing for a handover to the WLAN AP;
- sending the handover prepare message to the connected wireless device;
- receiving a preparation concluded message from the wireless device, the preparation concluded message includes an identifier identifying the WLAN AP to which the wireless device has prepared for the handover; and
- in response to receiving the preparation concluded message from the wireless device and prior to execution of the handover to the WLAN AP, sending a handover message to the wireless device indicating that the wireless device should execute the handover to the WLAN AP.

23. The radio access node of claim 22, the method further comprising selecting an AP in the WLAN, the access point being selected from one or more identifiers received from the wireless device.

24. The radio access node of claim 22, further comprising a neighbor information database arranged to store information on one or more second radio access networks within a coverage area of the first radio access network and eligible for handover from the first radio access network.

25. The radio access node of claim 22, wherein the node is further arranged to evaluate second radio access network measurement reports included in the preparation concluded message and to select access point for handover of the connected wireless device based on the measurement reports.

* * * * *